United States Patent [19]
Whelan et al.

[11] Patent Number: 6,010,734
[45] Date of Patent: Jan. 4, 2000

[54] LOW CALORIE FAT-CONTAINING FROZEN DESSERT PRODUCTS HAVING SMOOTH, CREAMY, NONGRITTY MOUTHFEEL

[75] Inventors: Richard Howard Whelan, Medfield; Marvin Jerry Rudolph, Sharon; Vanik Derenig Petrossian, Waban, all of Mass.

[73] Assignee: The Procter & Gamble Company, Cincinnati, Ohio

[21] Appl. No.: 09/113,345

[22] Filed: Jul. 10, 1998

Related U.S. Application Data

[63] Continuation of application No. 07/770,497, Oct. 3, 1991, abandoned, which is a continuation of application No. 07/474,189, Feb. 2, 1990, Pat. No. 5,084,295.

[51] Int. Cl.$^7$ .............................. A23G 9/00; A23D 7/00; A23L 1/10
[52] U.S. Cl. .......................... 426/565; 426/602; 426/611; 426/613; 426/567; 426/804
[58] Field of Search ..................................... 426/602, 603, 426/604, 611, 613, 804, 565, 567

[56] References Cited

U.S. PATENT DOCUMENTS

| | | |
|---|---|---|
| 3,028,649 | 12/1962 | Cobb . |
| 3,345,185 | 10/1967 | Pisani et al. . |
| 3,928,649 | 12/1975 | Cobb . |
| 3,949,102 | 4/1976 | Hellyer et al. . |
| 4,244,977 | 1/1981 | Kahn et al. . |
| 4,346,120 | 8/1982 | Morley et al. . |
| 4,374,154 | 2/1983 | Cole et al. . |
| 4,376,791 | 3/1983 | Holbrook et al. . |
| 4,400,405 | 8/1983 | Morley et al. . |
| 4,400,406 | 8/1983 | Morley et al. . |
| 4,452,823 | 6/1984 | Connolly et al. . |
| 4,452,824 | 6/1984 | Cole et al. . |
| 4,492,714 | 1/1985 | Cooper et al. . |
| 4,497,841 | 2/1985 | Wudel et al. . |
| 4,626,441 | 12/1986 | Wolkstein . |
| 4,650,690 | 3/1987 | Bams et al. . |
| 4,725,445 | 2/1988 | Ferrero . |
| 4,770,892 | 9/1988 | Grealy et al. . |
| 4,789,664 | 12/1988 | Seligson et al. . |
| 4,874,627 | 10/1989 | Greig et al. . |
| 4,880,657 | 11/1989 | Guffey et al. . |
| 4,885,156 | 12/1989 | Singer et al. . |
| 5,064,677 | 11/1991 | Caine et al. . |

FOREIGN PATENT DOCUMENTS

| | | |
|---|---|---|
| 233856 | 8/1987 | European Pat. Off. . |
| 236288 | 9/1987 | European Pat. Off. . |
| 290065 | 11/1988 | European Pat. Off. . |
| 290420 | 11/1988 | European Pat. Off. . |
| 1282502 | 7/1972 | United Kingdom . |

OTHER PUBLICATIONS

Haumann, "Getting the Fat Out: Researcher Seeks Substitutes for Full Fat Fat" J. Am. Oil Chem. Soc., vol. 63, No. 9 (1986), pp. 278–88.
W. S. Arbuckle, Ice Cream, 3$^{rd}$ Edition (AVI Publishing Company 1977).
Robinson, Modern Dairy Technology, Advances in Milk Products, vol. 1, (1986), pp. 229–31.
Paul et al., Food Theory and Applications (1972), p. 585.
Harper et al, Dairy Technology and Engineering (1976), pp. 422–27.
Webb et al, Fundamentals of Dairy Chemistry (2$^{nd}$ Ed., 1974), pp. 572–77.
Webster's II New Riverside University Dictionary, 1984, The Riverside Publishing Company, p. 589.

*Primary Examiner*—Anthony J. Weier
*Attorney, Agent, or Firm*—James F. McBride; Karen F. Clark; Jacobus C. Rasser

[57] ABSTRACT

Low calorie frozen desserts, in particular ice cream-like products, having a smooth, creamy, nongritty mouthfeel are can be produced. These frozen desserts contain fat that contains from about 30 to 100% of certain edible, wholly or partially nondigestible intermediate melting polyol polyesters, milk solids other than fat, sweetener, oil-in-water emulsifier, a flavoring substance, and water. The fat is substantially homogeneously dispersed in the aqueous phase as emulsified fat particles having an average particle size of about 5 microns or less. These frozen desserts are obtained by a process which initially involves the formation of a preemulsion by homogenizing a mixture which consists essentially of these intermediate melting polyol polyesters and only a portion of the other dessert ingredients. This preemulsion is then combined with the remaining dessert ingredients, homogenized, pasteurized, and at least partially frozen to provide the frozen desserts.

27 Claims, No Drawings

LOW CALORIE FAT-CONTAINING FROZEN DESSERT PRODUCTS HAVING SMOOTH, CREAMY, NONGRITTY MOUTHFEEL

CROSS-REFERENCES TO RELATED APPLICATIONS

This application is a continuation of, U.S. Ser. No. 07/770,497 filed on Oct. 3, 1991, now abandoned, application Ser. No. 07/770,497 is a continuation of U.S. Pat. No. 5,084,295 (application Ser. No. 07/474,189) which was filed on Feb. 2, 1990, and which issued on Jan. 28, 1992.

TECHNICAL FIELD

This application relates to low calorie fat-containing frozen dessert products that have a relatively smooth, creamy, nongritty mouthfeel. This application further relates to a process for preparing such frozen desserts.

Ice cream and other frozen dessert products (e.g., frozen custards, ice milk, mellorines) are marketed internationally to many consumers. Ice cream is particularly recognized for its smooth, creamy texture which is achieved by a delicate balance of formulated ingredients and processing steps to provide the desired coldness, meltdown, mouthfeel, and taste characteristics normally expected of such high-quality frozen dessert products. A primary component of ice cream products are the dairy-based ingredients. In earlier times, milk and cream provided the basic ingredients, i.e. milk protein, milk sugar, milkfat (butterfat), emulsifiers and stabilizers, necessary for making ice cream products. In current commercial operations, this ice cream formulation can comprise added nonfat milk solids, milkfat, sugar and water to replace in whole or in part the milk/cream, as well as other nondairy ingredients such as egg yolks, emulsifiers and stabilizers.

In a typical commercial ice cream operation, a mixture of cream, milk, sugar, added water (optional), added nonfat milk solids (optional), emulsifiers (optional), and stabilizers (optional) is formed, pasteurized and then passed through either a single, or double-stage, homogenizer. During homogenization, the globules of milkfat that are present in the cream and milk are broken up and dispersed as relatively small fat droplets or particles (0.1 to 2 microns in size) in a continuous aqueous phase, i.e. an oil-in-water emulsion is formed. During the freezing step, the homogenized mixture is typically subjected to agitation, whipping and aeration to incorporate the desired amount of air (referred to as "overrun"), and to avoid the formation of large ice crystals in, and/or a stratification of, the product. Flavoring substances (e.g., vanilla) are typically added to this homogenized mixture before it is fully hardened to provide a firm ice cream product. Because of the relatively small particle size of the dispersed milkfat due to homogenization, as well as the small particle size of the dispersed ice crystals and air cells formed during freezing, conventional firm ice cream products provide a relatively smooth, creamy mouthfeel.

By definition, ice cream contains at least 10% milkfat and can contain up to as high as about 20% milkfat in certain rich, high quality ice cream products. The milkfat present in ice cream products can provide a significant number of calories, i.e. milkfat has a caloric density of about 9 calories per gram versus protein (e.g., present in nonfat milk solids) which provides only about 4 calories per gram. To reduce the number of calories, ice milks have been formulated to be low in milkfat (i.e., from 2 to 7% milkfat) by using primarily, or exclusively, nonfat milk solids in its place. However, ice milks containing relatively high percentages of nonfat milk solids can impart gritty or chalky mouthfeel impressions due to the overall higher level of solids that do not melt at mouth temperatures, as well as the higher concentration of crystallized lactose that can be present in nonfat milk solids. In addition, milkfat imparts a desirable, lubricious mouthfeel as it melts at mouth temperatures. Accordingly, due to the low level of milkfat present in ice milk products, they do not impart the same lubricious mouthfeel that is typically provided by ice cream products.

Certain polyol fatty acid polyesters have been suggested as low calorie substitutes for conventional triglyceride fats. For example, U.S. Pat. No. 3,600,186 to Mattson et al, issued Aug. 17, 1971, discloses low calorie food compositions in which at least a portion of the fat content of a fat-containing food is provided by a nonabsorbable, nondigestible sugar fatty acid ester or sugar alcohol fatty acid ester having at least 4 fatty acid ester groups with each fatty acid having from 8 to 22 carbon atoms. Unfortunately, regular ingestion of moderate to high levels of completely liquid forms of these polyol polyesters can produce undesirable laxative side effects, namely, leakage of the polyesters through the anal sphincter. By contrast, completely solid versions of these polyesters provide a sufficiently high solids content at mouth temperatures such that they taste waxy in the mouth when ingested.

As an alternative to these completely liquid or completely solid nondigestible/nonabsorbable polyol polyesters, certain intermediate melting polyol (e.g., sucrose) fatty acid polyesters have been developed that provide anal leakage control at body temperatures (i.e. at 98.6° F., 37° C.), without causing excessive waxiness when ingested at mouth temperatures (i.e., at 92° F., 33.3° C.). See European patent application 236,288 to Bernhardt, published Sep. 9, 1987, and European patent application 233,856 to Bernhardt, published Aug. 26, 1987. These intermediate melting polyol polyesters exhibit a unique rheology at body temperatures due to a matrix involving a minimal level of solids (e.g., about 12% or lower) to bind the remaining liquid portion. As a result, these intermediate melting polyol polyesters are sufficiently viscous and have a sufficiently high liquid/solid stability at body temperatures to control anal leakage. An example of such intermediate melting polyol polyesters are those obtained by substantially completely esterifying sucrose with a 55:45 mixture of fully hydrogenated (hardstock) and partially hydrogenated soybean oil fatty acid methyl esters. See Examples 1 and 2 from these European patent applications.

European patent applications 236,288 and 233,856 disclose these intermediate melting polyol polyesters to be useful as total or partial replacements for other fats in fat-containing food products, including ice cream and other fat-containing frozen desserts. For example, these intermediate melting polyol polyesters can be substituted for the milkfat present in conventional commercial Lice cream formulations to provide lower calorie ice cream-type frozen desserts. However, the preparation of acceptable ice cream-type formulations from these intermediate melting polyol polyesters is not straight-forward. Formulations containing these polyol polyesters and all of the remaining dessert ingredients (e.g., nonfat milk solids, sugar, etc.) do not mix together well, especially in large quantities, and tend to separate into two distinct phases.

Moreover, when these ice cream-type formulations are passed through a homogenizer, the intermediate melting polyol polyesters are dispersed in the aqueous phase as significantly larger particles (e.g, about 10 microns or greater), especially when compared to the dispersed milkfat particles present in conventional ice cream products. This larger particle size occurs even if an oil-in-water emulsifier, such as polysorbate 60, is included in the formulation. The resulting frozen dessert products having these larger intermediate melting polyol polyester particles impart a gritty, sand-like impression, followed by a waxy mouthfeel impression that is unlike a conventional ice cream product. Accordingly, it would be desirable to be able to formulate a frozen dessert containing these polyol polyesters which imparts a smooth, creamy, nongritty mouthfeel impression like that provided by conventional ice cream products.

BACKGROUND ART

European patent application 236,288 to Bernhardt. published Sep. 9, 1987, discloses certain edible, wholly or partially nondigestible intermediate melting polyol (e.g., sucrose) fatty acid polyesters having certain rheological properties (e.g., viscosity, liquid/solid stability) at body temperatures. See page 4. Amongst the various uses disclosed for these intermediate melting polyol polyesters are as partial or total fat replacers in food products, including ice cream and other fat-containing frozen desserts. See page 14. See also European patent application 233,856 to Bernhardt, published Aug. 26, 1987, which discloses combinations of these intermediate melting polyol polyesters with digestible food materials (e.g., triglycerides) which act as a solvent that can be used in dairy products.

European patent application 290.065 to Guffey et al. published Nov. 9. 1988, discloses food or beverage compositions having altered flavor display which contain polar or intermediate polarity flavor compounds, as well as a fat phase containing edible, wholly or partially nondigestible intermediate melting sucrose fatty acid polyesters. Amongst the various examples of these food or beverage compositions are ice cream and other fat-containing frozen desserts. Example 2 discloses the preparation of an ice cream-like product by first mixing together half of the sucrose with carrageenan and liquid sugar, mixing together the remaining half of the sucrose with gelatin and hot water, combining these two mixtures with the remaining ingredients (milk, cream, corn syrup, egg yolks, intermediate melting sucrose polyesters, polysorbate 60, monoglyceride emulsifier, and vitamins), pasteurizing this combined mixture, and then homogenizing the pasteurized mixture at 2,000 psi in the first stage and at 500 psi in the second stage. This homogenized mixture is then slowly cooled to 80°–90° F. (26.7°–32.2° C.), and stored overnight at 40° F. (4.4° C.). Colorant and vanilla is then added to the cooled mixture which is then aerated and frozen to provide the ice cream-like product.

U.S. Pat. No. 4,626,441 to Wolkstein, issued Dec. 2. 1986, discloses dietetic frozen desserts containing aspartame which are free of, or low in, milkfat, animal fat and/or vegetable fat, to provide a significant reduction in calories. Nondigestible, nonabsorbable sucrose fatty acid polyesters are specifically disclosed as being useful in replacing from about 10 to 100% of the milkfat typically present in such frozen desserts. See Column 4, lines 32–48. Example 4 discloses a mellorine frozen dessert containing 4 16% fat which can comprise 10 to 100% of these sucrose polyesters. Example 15 discloses the preparation of a frozen dessert by combining milkfat solids, nonfat milk solids, polydextrose, microcrystalline cellulose, fermented demineralized whey, aspartame and water, heating this mixture to dissolve the ingredients, pasteurizing the mixture, homogenizing the pasteurized mixture at about 2200 psi in the first stage and at 500 psi in the second stage, cooling the homogenized mixture to 38° F. (3.3° C.), aging the cooled mixture for 20 hours, adding color and flavor to the aged mixture, and then freezing the flavored mixture while blowing in air to 120% overrun. At the end of this example, it is indicated that sucrose polyesters can be substituted for about 50% of the milkfat solids to further reduce the calorie content.

U.S. Pat. No. 4,789,664 to Seligson et al. issued Dec. 6. 1998, discloses food compositions containing certain minimum levels of both nondigestible, nonabsorbable sucrose fatty acid polyesters and vegetable (e.g., soy) protein for the purpose of lowering plasma cholesterol and triglyceride levels. Specific forms of these food compositions include ice cream and other frozen desserts where the casein is replaced by vegetable protein and the milkfat is replaced by the sucrose polyesters. The sucrose polyesters disclosed as being useful in these food compositions include intermediate melting sucrose polyesters. See Column 9, line 29, to Column 10, line 68. Example 4 describes the preparation of a frozen dessert similar to commercial ice cream. This dessert is prepared by first melting together triglycerol monostearate and stearic acid soap, combining this melted mixture with high fructose corn syrup, sucrose and water, and then subjecting the resulting mixture to high shear to provide an emulsifier-water dispersion. A melted mixture of triglyceride oil, propylene glycol monostearate and sucrose polyesters (derived from soybean oil (Iodine Value 107) fatty acids) is blended into this emulsifier-water dispersion and is then subjected to additional high shear mixing. The resulting emulsion is cooled and then flavor is added with additional high shear mixing. A portion of this flavored emulsion is blended in a home mixer operated at high speed with milk, and a dry mix containing sucrose, dextrose, tapioca starch, soy protein isolate, coloring, and a stabilizing system (carboxymethyl cellulose, citric acid, tetrasodium pyrophosphate, hydroxypropylcellulose, and carrageenan gum). The resulting aerated mixture is then frozen to provide the dessert.

European patent application 290,420 to Guffey et al. published Nov. 9. 1988, discloses shortening products made with edible, wholly or partially nondigestible intermediate melting sucrose polyesters, as well as food compositions having enhanced flavors due to the addition of these shortenings. Amongst the various examples of these food compositions are ice cream, ice milk, ices, sherbets, sorbets, mellorines, milkshakes, and other fat-containing frozen desserts. See page 6.

DISCLOSURE OF THE INVENTION

The present invention relates to low calorie frozen desserts, in particular ice cream-like products, which comprise:
(a) from about 2 to about 20% fat comprising from about 30 to 100% of edible, wholly or partially nondigestible polyol fatty acid polyesters having at least 4 fatty acid ester groups, wherein the polyol contains at least 4 hydroxy groups and wherein each fatty acid group has from 2 to 24 carbon atoms, the polyol polyester further having:
 (1) a viscosity of from about 2.5 to about 200 poise at 100° F. (37.8° C.) and at a shear rate of 10 seconds$^{-1}$;
 (2) a liquid/solid stability of at least about 30% at 100° F. (37.8° C.);
(b) from about 3 to about 15% milk solids other than fat;
(c) an effective amount of a sweetener;
(d) an effective amount of an oil-in-water emulsifier;
(e) an effective amount of a flavoring substance;

(f) from about 50 to about 75% water;

(g) wherein the fat is substantially homogeneously dispersed in the aqueous phase as emulsified fat particles having an average particle size of about 5 microns or less.

Surprisingly, the low calorie frozen dessert products of the present invention have a smooth, creamy, nongritty mouthfeel that is more like that of a conventional ice cream product. This is believed to be due to the fact that the intermediate melting polyol polyesters are dispersed as relatively fine emulsified fat particles in the continuous aqueous phase, similar to the dispersion of milkfat particles in a conventional ice cream product.

The low calorie frozen desserts of the present invention having this smooth, creamy, nongritty mouthfeel impression are obtained by the process which comprises the step of:

(a) forming a mixture consisting essentially of:
  (1) from about 30 to about 50% fat comprising from about 70 to 100% of edible, wholly or partially nondigestible intermediate melting polyol polyesters, as previously defined;
  (2) from about 10 to about 30% milk solids other than fat,
  (3) from 0 to about 10% of a sweetener,
  (4) from 0 to about 3% of a stabilizer,
  (5) an effective amount of an oil-in-water emulsifier, and
  (6) from about 25 to about 45% water;

(b) homogenizing the mixture of step (a) in a manner such that a stable oil-in-water preemulsion is formed wherein the fat is substantially homogeneously dispersed in the aqueous phase as emulsified fat droplets;

(c) forming a second mixture comprising:
  (1) from about 10 to about 30% of the preemulsion of step (a),
  (2) from 0 to about 15% added triglyceride fat;
  (3) from about 2 to about 14% added milk solids other than fat,
  (4) from 0 to about 20% added sweetener,
  (5) from about 36.5 to about 73.5% added water,
  (6) the combined amount of components (1) and (2) being sufficient to provide from about 2 to about 20% total fat,
  (7) the combined amount of components (1) and (3) being sufficient to provide from about 3 to about 15% total milk solids other than fat,
  (8) the combined amount of components (1) and (4) being sufficient to provide an effective amount of sweetener, and
  (9) the combined amount of components (1) and (5) being sufficient to provide from about 50 to about 75% total water;

(d) homogenizing and pasteurizing the second mixture of step (c) in a manner such that a homogenized pasteurized mixture is obtained wherein the fat is substantially homogeneously dispersed in the aqueous phase as emulsified fat droplets having an average droplet size of about 5 microns or less; and (e) at least partially freezing the homogenized pasteurized mixture of step (d) to provide the frozen dessert product.

A. Definitions

As used herein, the term "frozen dessert" refers to partially frozen or fully hardened homogenized pasteurized mixtures containing fat, milk solids other than fat, sweetener, flavoring substances, emulsifier, water, and other optional ingredients such as stabilizers, egg yolk solids and coloring. Frozen desserts of the present invention can be firm, solid products, or can be pumpable, semisolid products (e.g., can be in the form of soft serve-type products). Frozen desserts of the present invention include, but are not limited to, products similar in form and fat content to conventional ice cream, frozen custards (also called "french" ice creams), mellorines, ice milks, and sherbets. Particularly preferred frozen desserts of the present invention are in the form of ice cream-like products.

As used herein, the term "fat" refers to the total amount of triglyceride fat and Intermediate melting polyol polyesters that are present in the frozen desserts of the present invention, as well as ingredient mixtures used in preparing such products. Milkfat (also called "butterfat") is the primary, or exclusive, triglyceride fat present in such products or mixtures, although other triglyceride fats can also be present, typically in minor amounts as part of the source of flavoring substances.

As used herein, the term "milk solids other than fat" refers to the total amount of milk solids (on a dry basis) exclusive of milkfat, that are present in the frozen desserts of the present invention, or ingredient mixtures used in preparing such products. Milk solids other than fat include milk protein (e.g. casein), milk sugars (e.g. lactose), minerals, and vitamins. Although milk solids other than fat are usually derived from dairy-based sources, nondairy-based sources of protein, such as vegetable (e.g., soy) protein, can be wholly or partially substituted for such solids.

By "wholly nondigestible" is meant that substantially all of the intermediate melting polyol polyesters are not digested by the body, i.e. the polyesters pass through the digestive system substantially the same as when ingested. The term "partially nondigestible" means that at least about 30% of the intermediate melting polyol polyesters are not digested. Preferably at least about 70% of the intermediate melting polyol polyesters are not digested.

By "liquid/solid stability" as used herein is meant that the liquid portion of the intermediate melting polyol polyesters does not readily separate from the solid portion at body temperatures, i.e., the intermediate melting polyol polyesters appear to be a solid even though up to 95% or more of the polyesters are liquid. Liquid/solid stability is measured by centrifuging a sample of the intermediate melting polyol polyesters at 60,000 rpm for one hour at 100° F. (37.8° C.). Liquid/solid stability is defined as: 100% minus the volume percentage of the intermediate melting polyol polyesters that separate as a liquid after centrifuging.

As used herein, the term "comprising" means various components can be conjointly employed in the frozen dessert products of the present invention, or in ingredient mixtures used in preparing such products. Accordingly, the term "comprising" encompasses the more restrictive terms "consisting essentially of" and "consisting of."

All percentages and proportions used herein are by weight unless otherwise specified.

B. Composition of Frozen Dessert Products

1. Fat

A key component of the frozen dessert products of the present invention, especially in terms of textural (e.g., mouthfeel) properties, is the fat. The particular amount of fat present in these frozen desserts can vary depending upon the textural properties and product form desired. Frozen desserts of the present invention can comprise from about 2 to about 20% fat. Particularly preferred frozen desserts of the present invention comprise from about 10 to about 20%, most preferably from about 14 to about 18%, fat. The fat level of these preferred frozen desserts corresponds to the milkfat level of conventional ice cream products. Accordingly, these preferred frozen desserts are particularly desirable for providing ice cream-like products.

A particularly important characteristic of the fat present in the frozen desserts of the present invention is the fact that it is substantially homogeneously dispersed in the aqueous phase as emulsified particles having an average particle size of about 5 microns or less, preferably about 2 microns or less. This dispersion of relatively fine emulsified fat particles is similar to the dispersion of milkfat particles in a conventional ice cream product. Accordingly, and surprisingly, frozen dessert products of the present invention comprising this dispersion of finer emulsified fat particles have a smooth, creamy, nongritty mouthfeel that is more like that of conventional ice cream products. By contrast, it has been found that frozen desserts having larger dispersed emulsified fat particles (e.g., about 10 microns or greater) impart a gritty, sand-like impression, followed by a waxy mouthfeel impression that is unlike conventional ice cream products.

The fat present in the frozen dessert products of the present invention comprises in whole, or in part, certain intermediate melting polyol polyesters that provide reduced calorie benefits, the balance of the fat being a digestible triglyceride fat, usually milkfat. The proportion of intermediate melting polyol polyesters which are present in the fat depends upon the reduced calorie benefits desired, the total level of fat in the product, and the textural, in particular, mouthfeel properties, desired. For frozen dessert products of the present invention, the fat can comprise from about 30 to 100% of these polyol polyesters. Preferably, the fat comprises from about 50 to 100% of these polyol polyesters.

The intermediate melting polyol polyesters useful in the present invention are edible, wholly or partially nondigestible polyol fatty acid polyesters having at least 4 fatty acid ester groups, wherein the polyol(e.g., a sugar, a sugar alcohol or a sugar derivative such as an alkyl glycoside) contains at least 4 (preferably from 4 to 8) hydroxy groups prior to esterification, and wherein each fatty acid group has from 2 to 24 carbon atoms. These intermediate melting polyol polyesters are particularly characterized by the following physical properties: (a) a viscosity of from about 2.5 to about 200 poise at 100° F. (37.8° C.) and at a shear rate of 10 seconds$^{-1}$; and (b) a liquid/solid stability of at least about 30% at 100° F. (37.8° C.).

To measure the viscosity of a sample of the intermediate melting polyol polyesters, a plate and cone viscometer is used. The viscosity is measured after 10 minutes of shear at a constant shear rate of 10 sec$^{-1}$. At 100° F. (37.8° C.), the polyol polyesters useful in the present invention typically have a viscosity in the range of from about 2.5 to about 200 poise at a shear rate of 10 seconds$^{-1}$. Preferably, the polyol polyesters have a viscosity of from about 5 to about 100 poise. Most preferred polyol polyesters have a viscosity of from about 20 to about 60 poise.

As discussed above, the present intermediate melting polyol polyesters have a high liquid/solid stability inasmuch as the liquid portion of these polyol polyesters does not readily separate from the solid portion. At 100° F. (37.8° C.), these intermediate melting polyol polyesters have a liquid/solid stability of at least about 30%, preferably at least about 50%, more preferably at least about 70%, and most preferably at least about 80%.

Moreover, the present intermediate melting polyol polyesters are sufficiently viscous and stable even at relatively low levels of solids. The Solid Fat Content (SFC) provides a reasonable approximation of the percent by weight solids of a particular fatty material at a given temperature. The present polyol polyesters desirably have a Solid Fat Content at 98.6° F. (37° C.) of about 20% or less. Particularly preferred SFC values at 98.6° F. (37° C.) are in the range of from about 4 to about 20%, and most preferably in the range of from about 6 to about 15%.

Preferred intermediate melting polyol polyesters for use in the present invention are selected from sugar fatty acid polyesters and sugar alcohol fatty acid polyesters. The term "sugar" is used herein in its generic sense to include monosaccharides, disaccharides, oligosaccharides, and polysaccharides. The term "sugar alcohol" is used in its generic sense to refer to the reduction product of sugars wherein the aldehyde or ketone group has been reduced to an alcohol. Preferred sugars or sugar alcohols contain 4 to 8 hydroxy groups prior to esterification. The fatty acid ester compounds are prepared by reacting a sugar or sugar alcohol with fatty acids as discussed below.

Examples of suitable monosaccharides are those containing 4 hydroxy groups such as xylose, arabinose, ribose and methylglucoside; the sugar alcohol derived from xylose, i.e., xylitol, is also suitable. The monosaccharide erythrose is not suitable since it only contains 3 hydroxy groups; however, the sugar alcohol derived from erythrose, i.e., erythritol, contains 4 hydroxy groups and is thus suitable. Among 5 hydroxy-containing monosaccharides that are suitable for use herein are glucose, mannose, galactose, fructose, and sorbose. A sugar alcohol derived from sucrose, glucose, or sorbose, e.g., sorbitol, contains 6 hydroxy groups and is also suitable as the alcohol moiety of the fatty acid ester compound. Examples of suitable disaccharides are maltose, lactose, and sucrose, all of which contain 8 hydroxy groups.

In preparing the intermediate melting polyol polyesters useful in the present invention, the polyol (e.g., a sugar or sugar alcohol compound such as those identified above) is esterified with fatty acids having from 2 to 24 (preferably from 8 to 22), carbon atoms. Examples of such fatty acids are acetic, butyric, caproic, caprylic, capric, lauric, myristic, myristoleic, palmitic, palmitoleic, stearic, oleic, elaidic, ricinoleic, linoleic, linalenic, eleostearic, arachidic, behenic, and erucic. The fatty acids can be derived from suitable naturally occurring or synthetic fatty acids and can be saturated or unsaturated, including positional and geometric isomers. The polyol polyesters of this invention are usually, but not necessarily, mixed esters of fatty acids, rather than esters of a single type of fatty acid.

Fatty acids per se or naturally occurring fats and oils can serve as the source for the fatty acid portion of the polyol fatty acid polyester. For example, rapeseed oil provides a good source for $C_{22}$ fatty acid. $C_{16}$–$C_{18}$ fatty acids can be provided by tallow, soybean oil, or cottonseed oil. Shorter chain fatty acids (e.g., $C_{12}$–$C_{14}$ fatty acids) can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component. The fatty acids can be saturated, unsaturated, or mixtures thereof. The unsaturated fatty acids can include positional and geometric isomers (e.g., cis and trans isomers), or mixtures thereof. In order to provide the required physical properties, the polyols are preferably esterified with particular kinds of fatty acids. Preferably, at least about 70% of the fatty acids are selected from the group consisting of lauric, myristic, palmitic, stearic, oleic and elaidic ($C_{18:1}$), linoleic ($C_{18:2}$), and behenic acids and mixtures thereof.

Iodine Value is a measure of the degree of unsaturation of fatty acids that are esterified on the polyol. The intermediate melting polyol polyesters usually have an Iodine Value of from about 10 to about 70. A preferred group of these polyesters have Iodine Values of from about 15 to about 60. These preferred polyesters also have a fatty acid composition characterized by: (a) not more than about 0.6% fatty acids having 3 or more double bonds; (b) not more than about 20% fatty acids having 2 or more double bonds; and (c) not more than about 35% of the fatty acid double bonds are trans-double bonds. The percent trans-double bonds is calculated as follows:

$$P = \frac{D_{trans}}{D_{total}} \times 100\%$$

where P = percent trans-double bonds
$D_{trans}$ = trans fatty acids (by IR)
$D_{total}$ = total number of double bonds Preferred fatty acid compositions for these preferred polyesters are:
less than about 12% palmitic acid;
from about 30 to about 70% stearic acid;
from about 15 to about 60% oleic and elaidic ($C_{18:1}$) acids;
less than about 12% linoleic ($C_{18:2}$) acid; and
less than about 0.6% linolenic ($C_{18:3}$) acid.

Most preferred fatty acid compositions for these preferred polyesters are:
less than about 12% palmitic acid;
from about 40 to about 70% stearic acid;
from about 20 to about 50% oleic and elaidic ($C_{18:1}$) acid;
less than about 12% linoleic ($C_{18:2}$) acid; and
less than about 0.6% linolenic ($C_{18:3}$) acid.

With regard to reduced calorie benefits, a characterizing feature of the intermediate melting polyol polyesters useful in the present invention is that they predominantly contain at least 4 fatty acid ester groups. Polyol fatty acid polyester compounds that contain 3 or less fatty acid ester groups are digested in the intestinal tract much in the manner as ordinary triglyceride fats, but polyol fatty acid polyester compounds that contain 4 or more fatty acid ester groups are digested to a lesser extent and thus have the desired reduced calorie properties.

Highly preferred intermediate melting polyol polyesters are sucrose fatty acid polyesters. Preferred sucrose fatty acid polyesters have the majority of their hydroxy groups esterified with fatty acids. Preferably at least about 85%, and most preferably at least about 95%, of the esters are octaesters, heptaesters, hexaesters, or mixtures thereof. Preferably, no more than about 40% of the esters are hexaesters or heptaesters, and at least about 60% of the esters are octaesters. Most preferably at least about 70% of the esters are octaesters. It is also most preferred that the polyesters have a total content of penta- and lower esters of not more than about 3%.

The intermediate melting polyol polyesters suitable for use herein can be prepared by a variety of methods well known to these skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. As an example, the preparation of sugar and sugar alcohol fatty acid esters is described in U.S. Pat. Nos. 2,831,854, 3,963,699, 4,517,360 and 4,518,772, all of which are incorporated by reference.

The preferred intermediate melting polyol polyesters described above having maximum levels of fatty acids with two or more double bonds, as well as trans-double bonds, can be prepared using two source oil streams. For example, a sugar or sugar alcohol is esterified with a mixture of fatty acids from a primary source oil and a fully hydrogenated secondary source oil in a ratio between about 20:80 and about 80:20, preferably between about 50:50 and about 75:25. The primary source oil has an Iodine Value between about 65 and about 100, preferably between about 75 and about 95, and the fully hydrogenated oil has an Iodine Value between about 1 and about 12, preferably between about 1 and about 8. The partially hydrogenated portion is derived by a catalytic process which provides low levels of polyunsaturated fatty acids, and low levels of trans configurated double bonds. For example, the following hydrogenation conditions are suitable for obtaining partially hydrogenated oils having low levels of polyunsaturated acids and trans-double bonds: 0.02% by weight nickel catalyst, 40 psig pressure, 270° F. (135° C.) initial temperature, and 320° F. (160° C.) reaction temperature.

An alternative method for preparing these preferred polyol polyesters involves:
(1) esterifying a polyol with a mixture of fatty acids from a primary source oil and a secondary fully hydrogenated source oil in a ratio between about 20:80 and about 80:20, the primary source oil having an Iodine Value between about 65 and about 100, and the fully hydrogenated oil having an Iodine Value between about 1 and about 12; and
(2) esterifying a polyol with a mixture of fatty acids from a tertiary source oil, the tertiary source oil having an Iodine Value of from about 65 to about 100; and
(3) blending the esterified products of steps (1) and (2).

The preferred Iodine Values for the primary and tertiary streams are from about 75 to about 95 and the preferred Iodine Values for the secondary stream are from about 1 to about 8. The ratio of polyol polyesters prepared from a primary source oil stream to polyol polyesters prepared from a secondary source oil stream is between about 20:80 and 80:20, preferably between about 50:50 and 75:25.

Source oils particularly suitable for use in preparing these preferred polyol polyesters include hardened and partially hardened canola, corn, safflower, high oleic safflower, soybean, peanut, sunflower or high oleic sunflower oils. Mixtures of these oils are also suitable. See U.S. application Ser. No. 421,867, to Robert W. Johnston, Josephine L. Kong-Chan, Richard G. Schafermeyer and Paul Seiden, filed Oct. 16, 1989 (herein incorporated by reference), which discloses these preferred polyol polyesters and their preparation.

2. Milk Solids Other Than Fat

Another key component of the frozen dessert products of the present invention are the milk solids other than fat. These milk solids other than fat enhance the palatability of the frozen dessert product, increase its food value and are a more economical source of solids than fat. The particular amount of milk solids other than fat present in these frozen desserts can vary, particularly depending upon the amount of fat which is present. Generally, the level of milk solids other than fat varies inversely to the level of fat (i.e., the higher the level of fat, the lower the level of milk solids other than fat) in order to maintain the proper total solids balance and to insure the proper textural and storage properties for the resulting frozen dessert product. Frozen desserts of the present invention can generally comprise from about 3 to about 15% milk solids other than fat. For preferred frozen desserts of the present invention in the form of ice cream-like products, the level of milk solids other than fat is typically from about 5 to about 10%.

A variety of dairy-based sources can be used to provide milk solids other than fat for frozen dessert products of the present invention. These dairy-based sources include cream, dry cream, fluid whole milk, concentrated whole milk, evaporated whole milk, sweetened condensed whole milk, superheated condensed whole milk, dried whole milk, skim milk, concentrated skim milk, evaporated skim milk, condensed skim milk, superheated condensed skim milk, sweetened condensed skim milk, sweetened condensed part-skim milk, nonfat dry milk, sweet cream buttermilk, condensed sweet cream buttermilk, dried sweet cream buttermilk, concentrated skim milk from which a portion of the lactose has been removed, casein, modified casein, casein prepared by precipitation with gums, ammonium caseinate, calcium caseinate, sodium caseinate, sweet dairy whey, neutralized acid whey, modified whey, whey protein concentrate, concentrated cheese whey and dried cheese whey, as well as mixtures of these sources. (The dairy-based sources of milk solids other than fat can also provide milkfat that forms a portion of the fat present in the frozen desserts of the present invention.) Particularly preferred dairy-based sources of milk solids other than fat for use in the present invention are condensed skim milk, sweetened condensed whole milk, fluid whole milk, nonfat dry milk, cream, and mixtures thereof. (Nondairy-based sources of protein such as vegetable, e.g., soy, protein can also be substituted in whole or in part for the milk solids other than fat.)

3. Sweeteners and Optional Bulking Agents

Another key component of the frozen dessert products of the present invention is an effective amount of a sweetener or sweeteners. Milk solids other than fat can contain a fairly high level of lactose (e.g., on the order of about 55%). However, lactose generally provides insufficient sweetness, particularly relative to higher intensity sweeteners such as sucrose. Accordingly, a higher intensity sweetener or sweeteners is needed in addition to any lactose that is present in the milk solids other than fat.

Suitable higher intensity nutritive carbohydrate sweeteners include sucrose, glucose, fructose, maltose, corn syrups including high fructose corn syrups and high maltose corn syrups, invert sugar, maple syrup, maple sugar, honey, brown sugar, refiners syrup (also known as liquid sugar or liquid sucrose), and mixtures of these sweeteners. The amount of nutritive sweetener included is selected to provide the desired sweetness intensity in the frozen dessert product. Usually, the nutritive sweetener comprises from about 10 to about 20% of the product. Preferably, the nutritive sweetener comprises from about 13 to about 16% of the product.

If an extra calorie reduction benefit is desired, noncaloric or reduced calorie sweeteners can be used wholly or partially in place of the nutritive carbohydrate sweeteners. Suitable noncaloric or reduced calorie sweeteners include, but are not limited to, aspartame; saccharin; alitame, thaumatin; dihydrochalcones; cyclamates; steviosides; glycyrrhizins, synthetic alkoxy aromatics, such as Dulcin and P-4000; sucralose, suosan; miraculin; monellin; sorbitol; xylitol; talin; cyclohexylsulfamates; substituted imidazolines; synthetic sulfamic acids such as acesulfame, acesulfam-K and n-substituted sulfamic acids; oximes such as perilartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alphaaminodicarboxylic acids and gem-diamines; and 3-hydroxy-4-alkyloxyphenyl aliphatic carboxylates or heterocyclic aromatic carboxylates. The particular amount of noncaloric or reduced calorie sweetener included in the frozen dessert product will depend on the sweetness intensity of the particular sweetener and the sweetness effect desired.

When these noncaloric or reduced calorie sweeteners are used, it can be desirable to include bulking or bodying agents. Suitable bulking or bodying agents include partially or wholly nondigestible carbohydrates, for example, polydextrose and cellulose or cellulose derivatives, such as carboxymethylcellulose, carboxyethylcellulose, hydroxypropylcellulose, methylcellulose, hydroxypropyl methylcellulose, and microcrystalline cellulose. Other suitable bulking/bodying agents include starches, gums (hydrocolloids), fermented whey, tofu, and maltodextrins.

A particularly desirable class of nondigestible bulking agents are certain 5-C-hydroxymethyl hexose compounds and their derivatives that act like "reduced calorie sugars" in terms of their ability to provide the functional properties of nutritive carbohydrate sweeteners (e.g., sucrose), but without the sweetness or the calories. See U.S. application Ser. No. 339,531 to Adam W. Mazur, filed Apr. 20, 1989 (herein incorporated by reference), which discloses these reduced calorie sugars and their synthesis and U.S. application Ser. No. 337,725 to Adam W. Mazur, George D. Hiler, Jr., Gordon K. Stipp and Bernard W. Kluesener, filed Apr. 17, 1989 (herein incorporated by reference), for an alternative synthesis of the 5-C-hydroxymethyl aldohexoses. These reduced calorie sugars can comprise from about 10 to about 20% of the product.

4. Flavoring Substances

Another key component of the frozen dessert products of the present invention is an effective amount of a flavoring substance. Suitable flavoring substances can be in the form of whole or comminuted food pieces, purees, extracts, concentrates and essences, and can be derived from natural and/or synthetically produced sources. Examples of suitable natural flavorings include: (1) citrus and noncitrus fruit flavors (e.g., whole or comminuted fresh fruit, fruit purees, fruit concentrates, extracts or essences, candied or glazed fruits, and dried fruits); (2) sugar-free versions of such fruit flavorings; (3) flavors derived from botanicals; (4) spices; (5) chocolate, cocoa or chocolate liquor; (6) coffee; (7) natural flavorings obtained from vanilla beans; (8) nuts, including nutmeats and nut extracts from pecans, walnuts, almonds, pistachios, filberts and peanuts. Other sources of natural flavorings include liqueur flavorings such as alcohol, whiskey and other distilled beverages, fruit brandy distillate and brandy flavor essence, and fruit liqueurs. Examples of synthetically derived flavorings include aromatic chemicals and imitation flavors. The particular amount of flavoring substance included in the frozen dessert products of the present invention will depend upon the flavor effects desired and the particular flavoring substance used. Usually, the flavoring substance comprises from about 0.01 to about 20% of the product, and typically from about 0.2 to about 12% of the product.

5. Oil-in-Water Emulsifiers

Another key component of the frozen dessert products of the present invention is an effective amount of an oil-in-water emulsifier. The oil-in-water emulsifier is necessary in order to disperse the fat droplets or particles comprising the intermediate melting polyol polyesters in the continuous aqueous phase and to maintain a stable oil-in-water emulsion. In addition, emulsifiers facilitate air incorporation during freezing to provide a finer dispersion of air cells that imparts a smoother body and texture, and slower meltdown, to the resulting frozen dessert. Suitable oil-in-water emulsifiers for use in the present invention include distilled and undistilled mono- and diglycerides of $C_{16}$–$C_{18}$ fatty acids (e.g., DIMODAN 0), ethoxylated mono- and diglycerides, polyoxyethylene derivatives of hexahydric alcohols in particular polyoxyethylene (20) sorbitan monostearate (e.g., polysorbate 60), polyoxyethylene (20) sorbitan tristearate (e.g., polysorbate 65), and polyoxyethylene (20) sorbitan monooleate (e.g., polysorbate 80), propylene glycol monoesters of $C16–C_{18}$ fatty acids, diacetyl sodium sulfosuccinate, as well as mixtures of these emulsifiers. Preferred emulsifiers are the monoglycerides, polyoxyethylene (20) sorbitan monostearate, and mixtures thereof. The particular amount of oil-In-water emulsifier which is effective will typically depend upon the emulsifier used and the particular composition of the frozen dessert product, in particular the level of fat and intermediate melting polyol polyesters present. Usually, the frozen dessert product comprises from about 0.05 to about 2% emulsifier. Preferably, the emulsifier is included in the product in an amount of from about 0.1 to about 0.5%.

6. Water

Another key component of the frozen dessert products of the present invention is water. Water provides the continuous aqueous phase In which the emulsified fat particles, and other components present in the frozen dessert product, are dispersed, dissolved or suspended. Upon freezing, this continuous aqueous phase provides ice crystals which impart structural integrity and stability to the product. The source of water for the frozen dessert product can be added water, or can be supplied from other fluid dairy ingredients, such as those used to supply milk solids other than fat. The level of water present in the frozen dessert products of the present invention can vary depending upon the textural properties desired and the particular level of the remaining components. Usually, frozen dessert products of the present invention comprise from about 50 to about 75% water. Preferably, frozen desserts of the present invention comprise from about 55 to about 65% water.

7. Other Optional Ingredients

The frozen dessert products of the present invention can include other optional ingredients typically present in conventional frozen desserts. A particularly prominent example of optional ingredients often included in frozen dessert products are stabilizers. Stabilizers produce a smoothness in the textural properties of the product, retard or reduce ice crystal growth during storage of the product, provide uniformity in the product and resistance to melting. Stabilizers typically function through their ability to form gel structures in the water or their ability to combine with the water by hydration. (Certain of these stabilizers can also function as bulking or bodying agents if noncaloric or reduced calorie sweeteners are used.) Suitable stabilizers include sodium alginate, propylene glycol alginate, calcium sulphate, gelatin, gum acacia, guar gum, gum karaya, locust bean gum, gum tragacanth, carrageenan and salts thereof, xanthan gum, microcrystalline cellulose, cellulose ethers such as methyl cellulose, hydroxypropyl cellulose, hydroxypropylmethyl cellulose, carboxymethyl cellulose and its sodium salt, as well as mixtures of these stabilizers. Preferred stabilizers are carrageenan, gelatin, and mixtures thereof. The amount of stabilizer included in the frozen desserts of the present invention is typically that of conventional frozen desserts, e.g., in an amount of up to about 1% (typically from about 0.05 to about 0.5%) of the product.

Another optional ingredient which can be included in frozen dessert products of the present invention are egg yolk solids. Egg yolk solids are typically included in frozen dessert products in the form of frozen custards or "french" ice creams. Suitable sources of egg yolk solids include liquid egg yolks, frozen egg yolks, dried egg yolks, liquid whole eggs, frozen whole eggs, sugared frozen egg yolks, salted frozen egg yolks, dried whole eggs, or combinations of the foregoing egg yolk substances. When egg yolk solids are used, they are typically included at levels typically present in such frozen dessert products, e.g., in amounts of from about 1 to about 2% of the product.

Other optional ingredients that can be included in frozen dessert products of the present invention include mineral salts such as sodium and disodium citrate, disodium phosphate, tetrasodium pyrophosphate, sodium hexametaphosphate, calcium oxide, magnesium oxide and the like. These mineral salts are typically included for the purpose of improving the properties of the mixture of ingredients during preparation of the frozen dessert product, as well as improving the characteristics of the resulting frozen dessert product. Natural or artificial colorings can also be included in frozen dessert products of the present invention.

The frozen desserts of the present invention, especially the intermediate melting polyol polyesters therein, can be fortified with vitamins and minerals, particularly the fat-soluble vitamins. U.S. Pat. No. 4,034,083 to Mattson (herein incorporated by reference) discloses polyol fatty acid polyesters fortified with fat-soluble vitamins. The fat-soluble vitamins include vitamin A, vitamin D, vitamin E, and vitamin K. Vitamin A is a fat-soluble alcohol of the formula $C_{20}H_{29}OH$. Natural vitamin A is usually found esterified with a fatty acid; metabolically active forms of vitamin A also include the corresponding aldehyde and acid. Vitamin D is a fat-soluble vitamin well known for use in the treatment and prevention of rickets and other skeletal disorders. Vitamin D comprises sterols, and there are at least 11 sterols with vitamin D-type activity. Vitamin E (tocopherol) is a third fat-soluble vitamin which can be used in the present invention. Four different tocopherols have been identified (alpha, beta, gamma and delta), all of which are oily, yellow liquids, insoluble in water but soluble in fats and oils. Vitamin K exists in at least three forms, all belonging to the group of chemical compounds known as quinones. The naturally occurring fat-soluble vitamins are $K_1$ (phylloquinone), $K_2$ (menaquinone), and $K_3$ (menadione). The amount of the fat-soluble vitamins employed herein to fortify the present frozen dessert products can vary. If desired, the products can be fortified with a recommended daily allowance (RDA), or increment or multiple of an RDA, of any of the fat-soluble vitamins or combinations thereof. It is preferred that the products be supplemented with 0.88 to 1.1 mg. vitamin E in the form of d-alpha-tocopherol acetate per gram of the intermediate melting polyol polyesters.

Vitamins that are nonsoluble in fat can similarly be included in the present frozen dessert products. Among these vitamins are the vitamin B complex vitamins, vitamin C, vitamin G, vitamin H, and vitamin P. The minerals include the wide variety of minerals known to be useful in the diet, such as calcium, magnesium, and zinc. Any combinations of vitamins and minerals can be used in the present frozen dessert products.

C. Process for Preparing Frozen Dessert Products

1. Formation of Preemulsion Containing Intermediate Melting Polyol Polyesters

A key aspect of the process for preparing the frozen dessert products of the present invention is the initial formation of an oil-in-water preemulsion containing the intermediate melting polyol polyesters. This preemulsion is particularly characterized by the fact that the intermediate melting polyol polyesters are substantially homogeneously dispersed in the aqueous phase as emulsified fat droplets which are believed to have an average droplet size of about 5 microns or less. To achieve this droplet size reduction, the process of the present invention forms this preemulsion by homogenizing a mixture which consists essentially of the intermediate melting polyol polyesters and only a portion of the remaining dessert ingredients (e.g., milk solids other than fat, sweetener, etc.). This Is unlike the preparation of conventional frozen desserts, in particular ice cream, where all of the dessert ingredients, Including the milk fat, are homogenized in a single step. Indeed, it has been found that if a mixture of intermediate melting polyol polyesters and all of the other dessert ingredients are homogenized in a single step according to conventional ice cream making, the resulting homogenized mixture will contain much larger emulsified fat droplets (e.g., about 10 microns or greater), even if an oil-in-water emulsifier is used.

In preparing this preemulsion, a mixture is formed which consists essentially of the following ingredients:

(1) from about 30 to about 50% (preferably from about 35 to about 45%) fat comprising from about 70 to 100% (preferably from about 90 to 100%) intermediate melting polyol polyesters, as previously defined in part B of this application;

(2) from about 10 to about 30% (preferably from about 13 to about 24%) milk solids other than fat, as previously defined in part B of this application;

(3) from 0 to about 10% (preferably from about 1 to about 5%) of a sweetener, as previously defined in part B of this application;

(4) from 0 to about 3% (preferably from about 0.05 to about 2%) of a stabilizer, as previously defined in part B of this application;

(5) an effective amount (preferably from about 0.3 to about 0.8%) of an oil-in-water emulsifier; and (6) from about 25 to about 45% (preferably from about 30 to about 40%) water.

As noted previously, the above mixture provides only a portion of the total milk solids other than fat and sweetener present in the final frozen dessert product. For example, such mixtures provide up to about 55% of the total milk solids other than fat and up to about 5% of the total sweetener for an ice cream-like frozen dessert product. In forming these mixtures, sources of milk solids other than fat that are low in milkfat (e.g., condensed skim milk, nonfat dry milk) are preferably used. The components of the mixture can be combined or added together in any appropriate fashion, typically in the following order of addition: (1) intermediate melting polyol polyesters; (2) liquid ingredients (e.g., milk and water); and (3) dry ingredients (e.g., sweetener and stabilizer).

During and/or after the ingredients are combined and mixed together, the mixture is heated to a temperature high enough to melt/liquefy the intermediate melting polyol polyesters and to dissolve the water-soluble ingredients so as to provide a pumpable, fluid mixture. Usually, this mixture is heated to a temperature of from about 140° to about 190° F. (about 60° to about 87.8° C.), and preferably to a temperature of from about 170° to about 180° F. (from 76.7° to about 82.2° C.). This heated, fluid mixture is then subjected to a homogenization step. Homogenization is usually accomplished by forcing this fluid mixture through the small orifice of a homogenizer (or orifices in the case of a two-stage homogenizer), using a positive displacement plunger pump to furnish the appropriate pressure. This orifice consists of a valve and seat in which the two adjacent surfaces are parallel and lap smooth and is surrounded by an impact ring against which the fluid mixture of ingredients impinges as it leaves the valve. The breakup and size reduction of the fat droplets (e.g, the intermediate melting polyol polyesters) is caused by the shear forces that occur as a thin stream of the fluid mixture travels at a high velocity between the closely adjacent surfaces of the valve and the seat, and then by the shattering effect that occurs as the thin stream impinges on the impact ring upon leaving the valve. Size reduction of the fat droplets is also caused by cavitation effects. Cavitation is caused by the sudden release of pressure as the thin stream leaves the valve, which momentarily lowers the vapor pressure of the fluid mixture to a point where vapor pockets are formed. The fat droplets bounce back and forth inside these vapor bubbles and are shattered by impacts against the bubble walls, thus causing further size reduction.

The homogenization of this fluid mixture can be carried out by passing the heated fluid mixture through either a one-stage, or preferably two-stage homogenizer. See Arbuckle, *Ice Cream,* (1977 Avi Publishing Co.), pp. 216–218, for suitable one-stage and two-stage homogenizers, including those manufactured and sold by Gaulin and Cherry-Burrell Corp. In the case of one-stage homogenizers, suitable operating pressures can be in the range of from about 800 to about 3000 psi, with a preferred range of from about 1500 to about 2000 psi. In the case of two-stage homogenizers, the first stage can be operated at a pressure of from about 800 to about 3000 (preferably from about 1500 to about 2000) psi, while the second stage is operated at a pressure of from about 500 to about 1000 psi.

Homogenization of the fluid mixture of ingredients provides an oil-in-water preemulsion wherein the fat (e.g., intermediate melting polyol polyesters) is substantially homogeneously dispersed in the aqueous phase as emulsified fat droplets having an average droplet size of about 5 microns or less. Surprisingly, it has been found that this preemulsion is fairly stable, i.e. does not invert or separate into two phases. Accordingly, this preemulsion can be stored if cooled to and held at a temperature of about 40° F. (4.4° C.) or less, and preferably a temperature in the range of from about 32° to about 40° F. (about 0° to about 4.4° C.). This cooled preemulsion can be subsequently reheated for use in preparing the frozen dessert products of the present invention. More typically, this preemulsion is used fairly promptly in preparing frozen dessert products of the present invention to avoid the necessity of reheating it.

2. Formation of Homogenized Pasteurized Mixture From Preemulsion and Remaining Ingredients In the next stage of the process of the present invention, a homogenized pasteurized mixture is formed from the previously described preemulsion and the remaining ingredients. In preparing this homogenized pasteurized mixture, a second mixture is formed which comprises the following ingredients:

(1) from about 10 to about 30% (preferably from about 15 to about 25%) of the preemulsion;

(2) from about 0 to about 15% (preferably from 0 to about 8%) added triglyceride fat, typically in the form of milkfat;

(3) from about 2 to about 14% (preferably from about 3 to about 6%) added milk solids other than fat;

(4) from 0 to about 20% (preferably from about 10 to about 20%) added sweetener; and (5) from about 36.5 to about 73.5% (preferably from about 45 to about 55%) added water.

Other optional ingredients such as stabilizers and egg yolk solids can also be included in this second mixture. The sources of added milk solids other than fat can include those that are low in milkfat (e.g., milk), as well as those high in milkfat (e.g., cream). The combined amounts of the preemulsion, added triglyceride fat, added milk solids other than fat, added sweetener, and added water are such that this second mixture comprises:

(6) from 2 to about 20% (preferably from about 10 to about 20%) total fat;
(7) from about 3 to about 15% (preferably from about 5 to about 10%) total milk solids other than fat;
(8) an effective amount of (preferably from about 10 to about 20% total) sweetener; and
(9) from about 50 to about 75% (preferably from about 55 to about 65%) total water.

The components of the second mixture can be combined or added together in any appropriate fashion. A typical order of addition is as follows: (1) liquid ingredients (e.g., milk, cream, liquid sweetener and water); (2) preemulsion; and (3) dry ingredients (e.g. dry sweetener, stabilizer and egg yolk solids). Surprisingly, the preemulsion mixes well with the remaining dessert ingredients that comprise the second mixture, i.e., there is no phase separation in the second mixture. During and/or after the ingredients are combined and mixed together, the second mixture is heated to a temperature high enough to provide a pumpable, fluid mixture. Usually, this mixture is heated to a temperature of from about 135° to about 160° F. (about 57.2° to about 71.1° C.), and preferably to a temperature from about 145° to about 150° F. (about 62.8° to about 65.6° C.).

The fluid second mixture is then homogenized and pasteurized in a manner such that a homogenized pasteurized mixture is obtained wherein the fat (e.g., intermediate melting polyol polyesters) is substantially homogeneously dispersed in the aqueous phase as emulsified fat droplets having an average droplet size of about 5 microns or less, preferably about 2 microns or less. Within these guidelines, the particular order of the pasteurization and homogenization steps is not critical in preparing the frozen dessert products of the present invention. For example, the fluid second mixture can be homogenized, and then pasteurized, or if desired, pasteurized and then homogenized. Typically, this homogenized pasteurized mixture is obtained by first homogenizing the second fluid mixture, followed by pasteurization.

While not wishing to be bound by theory, it is believed that the relatively fine dispersion of emulsified fat droplets in this homogenized pasteurized mixture imparts positive textural benefits (e.g., smoother mouthfeel) to the resulting frozen dessert product due to the following effects:

1. The finer fat droplets provide an increased surface area to mass ratio that promotes clumping of the fat droplets and an increased viscosity in the homogenized pasteurized mixture. This increased viscosity promotes more uniform air incorporation during subsequent freezing, thus producing a frozen dessert with more uniform and smaller dispersed air cells.
2. The finer fat droplets help limit ice crystal size during freezing due to steric hindrance effects. A greater number of finer fat droplets interfere with the migration of water molecules to the existing ice crystals, thus causing a greater number of finer ice crystals to form during freezing.

Homogenization of this second mixture can be carried out in the same, or similar fashion, as the homogenization used to obtain the preemulsion. For example, homogenization of the second mixture can be carried out by passing it through either a one-stage, or preferably two-stage, homogenizer. In the case of one-stage homogenizers, suitable operating pressures can be in the range of from about 800 to about 3000 psi, with a preferred range of from about 1500 to 2000 psi.

In the case of two-stage homogenizers, the first stage can be operated at a pressure of from about 800 to about 3000 psi (preferably from about 1500 to about 2000) psi, while the second stage is operated at a pressure of from about 500 to about 1000 psi.

Pasteurization can be carried out according to the process of the present invention by any suitable method that is used in pasteurizing conventional frozen dessert products such as ice cream. See Arbuckle, *Ice Cream*, supra, at pages 211–15 (herein incorporated by reference), which describes the pasteurization of conventional ice cream products. For example, pasteurization can be carried out by batch methods (e.g., at a temperature of at least about 155° F. (68.3° C.), for at least about 30 minutes), high temperature short-time methods (e.g., at a temperature of at least about 175° F. (79.4° C.) for at least about 25 seconds), vacreation methods (e.g., at a temperature of at least about 194° F. (90° C.) for from about 1 to about 3 seconds), and ultrahigh temperature methods (e.g., at a temperature of from about 210° to about 265° F. (about 98.9° to about 129.4° C.) for from about 2 to about 40 seconds). The particular pasteurization method and temperature conditions used can alter the flavor characteristics of the mixture, e.g., can impart cooked flavors. Accordingly, the pasteurization method and temperature conditions used needs to be selected with such potential flavor effects in mind.

3. Aging, Adding Flavoring Substances, Freezing, Packaging and Hardening

The homogenized pasteurized mixture is typically rapidly cooled to a temperature of about 40° F. (4.4° C.) or less, and typically to a temperature in the range of from about 32° to about 40° F. (about 0 to about 4.4° C.). The cooled mixture is then typically held in this temperature range for a period of from about 1 to about 12 hours, preferably for from about 1 to about 2 hours, to age the mixture. Aging typically causes the following effects to occur in the mixture: (1) solidification of the fat; (2) swelling and hydration of any stabilizer present, e.g., gelatin; (3) slight changes in the protein present; and (4) increases in the viscosity of the mixture. Aging of the mixture is particularly desirable in terms of improving the textural properties and resistance to melting of the resulting frozen dessert product, as well as ease in incorporating air during subsequent freezing. See Arbuckle, *Ice Cream,* supra, at page 222.

The homogenized pasteurized mixture, with or without aging, is then subjected to a freezing step to partially freeze or solidify the mixture. The partial freezing of this homogenized pasteurized mixture can be carried out by any standard freezing method used in the preparation of conventional frozen dessert products such as ice cream. See Arbuckle, *Ice Cream,* supra, at pages 239–66, which is herein incorporated by reference. For example, the homogenized pasteurized mixture of the present invention can be partially frozen or solidified by using a batch freezer, continuous freezer, low temperature continuous freezer, a soft serve-type freezer, or a counter-type freezer. The particular temperature and time conditions for carrying out this partial freezing step can vary greatly depending upon the type of freezer used. For example, the homogenized pasteurized mixtures of the present invention can be partially frozen at temperatures in the range of from about 15° to about 28° F. (about −9.4° to about −2.2° C.) over a period of from about 24 seconds (e.g., continuous or low temperature continuous freezer) to about 10 minutes (e.g., batch or counter freezer). During partial freezing, it is often desirable to agitate, aerate and/or whip the mixture to incorporate air to provide the desired amount of overrun. The particular amount of overrun obtained can be any level appropriate for conventional frozen dessert products, in particular ice cream products.

Flavoring substances (and optionally coloring) can be added to the homogenized pasteurized mixture at any point where such substances are incorporated into conventional frozen dessert products such as ice cream. Typically, flavor extracts, essences and concentrates (e.g., vanilla) are added after the homogenized pasteurized mixture has been aged, but prior to partial freezing. Flavoring substances in the form of whole or comminuted food pieces (e.g., whole or chopped fruit or nuts) are typically added after the homogenized pasteurized mixture has been partially frozen. With these guidelines in mind, no particular criticality is attached to the point at which the flavoring substances are added to the homogenized pasteurized mixture.

After the flavoring substances have been added, the partially frozen mixture can be used as is to provide a soft-serve frozen dessert product. This partially frozen mixture is usually in the form of a semi-solid that is pumpable. To provide a firmer product, this partially frozen mixture is typically poured or pumped into a suitable package or container and then fully hardened. Hardening of this partially frozen mixture can be carried out using standard conditions typically used in the hardening of conventional frozen dessert products, in particular ice cream. See Arbuckle, *Ice Cream,* supra, at pages 270–75, which is herein incorporated by reference. Some typical conditions for hardening partially frozen mixtures of the present invention are temperatures of about −4° F. (−20° C.) or less (typically in the range of from about −10 to about −45° F. (about −23.3° to about −42.8° C.)) for a period of at least about 4 hours (typically for from about 12 to about 24 hours). Such hardening conditions typically provide a frozen dessert product having the firmness of a conventional ice cream product.

D. Analytical Methods for Intermediate Melting Polyol Polyesters

1. Viscosity Measurement a. Sample Preparation

A sample of the polyesters is melted in a hot water bath at greater than 190° F. (87.8° C.). The melted sample is thoroughly mixed and 10 grams of melted sample is weighed into a vial. The vial is covered and then heated in a hot water bath to greater than 190° F. (87.8° C.). The sample is then allowed to recrystallize at 100° F. (37.8° C.) in a constant temperature room. After a 24 hour time period has elapsed, the sample is taken to the viscometer and the viscosity is measured.

b. Ferranti-Shirley Viscometer Operation Procedure

A Ferranti-Shirley viscometer equipped with a 600 g. torque spring is used for the viscosity measurement. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds. The test is started by selecting the rpm for 10 seconds$^{-1}$ shear rate and record on the strip chart recorder. The shear stress is recorded at 10 minutes after the point at which the shear stress reaches the maximum value. Viscosity (poise)=shear stress (dynes/cm$^2$) divided by shear rate (second$^{-1}$).

2. Liquid/Solid Stability Measurement

A sample of the polyesters is heated in a hot water bath at greater than 190° F. (87.8° C.) until it completely melts and is then thoroughly mixed. The sample is then poured to capacity into 4.4 ml. centrifuge tubes at 100° F. (37.8° C.). The sample is then allowed to recrystallize for 24 hours at 100° F. (37.8° C.) in a constant temperature room. The sample is then centrifuged at 60,000 rpm in a Beckman Model L870M centrifuge having a Beckman Model SW60 head for one hour at 100° F. (37.8° C.). The maximum force on the sample (i.e. at the bottom of the tube) is 485,000 g's. The percent liquid separated is then measured by comparing the relative heights of the liquid and solid phases. Liquid/solid stability (%)=100×(total volume of sample−volume of liquid that separated)/total volume of sample.

3. Solid Fat Content Measurement

Before determining Solid Fat Content (SFC) values, a sample of the polyesters is heated to a temperature of 140° F. (60° C.) or higher for at least 30 minutes or until the sample is completely melted. The melted sample is then tempered as follows: at 32° F. (0° C.) for 15 minutes; at 80° F. (26.7° C.) for 30 minutes; and at 32° F. (0° C.) for 15 minutes. After tempering, the SFC values of the sample at temperatures of 50° F. (10° C.), 70° F. (21.1° C.), 80° F. (26.7° C.), 92° F. (33.3° C.) and 98.6° F. (37° C.) can be determined by pulsed nuclear magnetic resonance (PNMR) after equilibration for 30 minutes at each temperature. The method for determining SFC values by PNMR is described in Madison and Hill, *J. Amer. Oil Chem. Soc.,* Vol. 55 (1978), pp. 328–31 (herein incorporated by reference). Measurement of SFC by PNMR is also described in A.O.C.S. Official Method Cd. 16–81, *Official Methods and Recommended Practices of The American Oil Chemists Society,* 3rd. Ed., 1987 (herein incorporated by reference).

4. Fatty Acid Composition and Trans Fatty Acids

The fatty acid composition (FAC) of the polyesters is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society,* 3rd Ed., 1984, Procedure Ce 1–62.

The percentage of trans fatty acids in the polyester sample is determined by infrared spectrophotometry (IR). The IR method used is described in Madison et al, "Accurate Determination of trans Isomers in Shortenings and Edible Oils by Infrared Spectrophotometry." *J. Am. Oil Chem.,* Vol. 59, No. 4 (1982), pp. 178–81. The trans value obtained by IR, together with the total number of double bonds based on the FAC of the polyester sample, is used to calculate the percentage of trans double bonds.

5. Ester Distribution

The relative distribution of the individual octa-, hepta-, hexa- and penta- esters, as well as collectively the tetra- through mono- esters, of the polyesters can be determined using normal-phase high performance liquid chromatograph (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e., an evaporative light scattering detector). The detector response is measured and then normalized to 100%. The individual ester groups are expressed as a relative percentage.

Specific Illustrations of the Preparation of Ice Cream-Like Products of the Present Invention The following are specific illustrations of ice cream-like products prepared according to the present invention:

EXAMPLE 1

The following ingredients are used in preparing a french vanilla-flavored ice cream-like product:

| Ingredient | wt. % |
|---|---|
| Preemulsion | |
| Condensed skim milk (32% total solids) | 52.62 |
| Intermediate melting polyol polyesters | 44.90 |
| Polysorbate 60 | 0.27 |
| DIMODAN 0 | 0.27 |
| Carrageenan | 0.07 |
| Dry sucrose | 1.87 |
| | 100.00 |
| Total Composition | |
| Preemulsion | 21.38 |
| Fluid milk (3.4% fat) | 32.00 |
| Cream (40% fat) | 11.75 |
| Liquid sugar | 14.93 |
| Water | 9.23 |
| Sweetened whole condensed milk (8% fat) | 4.98 |
| Corn syrup (62 D.E.) | 2.98 |
| Frozen 10% sugared egg yolks | 1.49 |
| Dry sucrose | 0.60 |
| Gelatin | 0.20 |
| Vanilla | 0.40 |
| Color | 0.04 |
| | 100.00 |

The intermediate melting polyol polyesters are a sucrose polyester composition made by esterifying sucrose with a mixture of methyl esters derived from a 70/30 blend of partially hardened soybean oil (I.V. 80 to 85) and fully hydrogenated soybean oil (I.V. 1–8). This composition has the following physical and chemical properties:

| | |
|---|---|
| Viscosity (100° F., 37.8° C.) | 33.0 poise |
| Liquid/Solid Stability (100° F., 37.8° C.) | 95% |
| SFC (98.6° F., 37° C.) | 10.4% |
| I.V. | 41.2 |
| FAC | |
| C16:0 | 10.8% |
| C17:0 | 0.2% |
| C16:1 | 0.0% |
| C18:0 | 47.7% |
| C18:1 | 33.0% |
| C18:2 | 7.2% |
| C18:3 | 0.0% |
| C20:0 | 0.3% |
| C20:1 | 0.1% |
| C22:0 | 0.1% |
| C24:0 | 0.2% |
| Trans-fatty acids | 13.6% |
| Percent trans double bonds | 28.6% |
| Esters | |
| Octa | 92.8% |
| Hepta | 7.2% |

In forming the preemulsion, the intermediate melting polyol polyesters are weighed into a batch tank. The condensed skim milk is formed by slurrying a mixture of nonfat dry milk and water in a liquefier and then adding it to the batch tank. The DIMODAN 0 and polysorbate 60 emulsifiers are then added to the batch tank. A slurry of the sucrose and carrageenan stabilizer (blended for 5 minutes in a 20-quart Hobart mixer) is then added to the batch tank. The ingredients in the batch tank are mixed together and heated to 175° F. (79.4° C.), and then passed through a two-stage homogenizer operated at a pressure of 1700 psi in the first stage and 500 psi in the second stage. The preemulsion obtained is then cooled to a temperature of about 40° F. (4.4° C.) or less.

A second mixture of ingredients is formed by adding the fluid milk, cream, liquid sugar, water, sweetened whole condensed milk, preemulsion, corn syrup, egg yolks, and a blend of sucrose and gelatin (premixed for 5 minutes in a 20-quart Hobart mixer), to a mix tank in the order indicated. The contents of the mix tank are mixed together and heated to a temperature of from 145° to 150° F. (62.8° to 65.6° C.), and then passed through a two-stage homogenizer operated at a pressure of 1700 psi in the first stage and 500 psi in the second stage. This homogenized mixture is then pasteurized at 175° F. (79.4° C.) for three minutes. This homogenized pasteurized mixture is cooled to a temperature of approximately 40° F. (4.4° C.), and then aged at this cooler temperature for 1 to 2 hours. Vanilla flavor and coloring is added to the aged mixture. The flavored and colored mixture is frozen while incorporating air to 100% overrun at 22°–23° F. (−5.6° to −5.0° C.) for 26–36 seconds in a continuous freezer to provide an aerated semi-solid, pumpable mixture which is filled into containers and then fully hardened at −40° F. (−40° C.) for 16 hours to provide a firm product.

EXAMPLE 2

The following ingredients are used in preparing a french vanilla-flavored ice cream-like product:

| Ingredient | wt. % |
|---|---|
| Preemulsion | |
| Condensed skim milk (32% total solids) | 56.87 |
| Intermediate melting polyol polyesters | 40.44 |
| Polysorbate 60 | 0.29 |
| DIMODAN 0 | 0.29 |
| Carrageenan | 0.08 |
| Dry sucrose | 2.03 |
| | 100.00 |
| Total Composition | |
| Preemulsion | 19.78 |
| Milk (3.4% fat) | 24.89 |
| Cream (40% fat) | 15.83 |
| Liquid sugar | 14.93 |
| Water | 13.86 |
| Sweetened whole condensed milk (8% fat) | 4.98 |
| Corn syrup (62 D.E.) | 2.99 |
| 10% sugared egg yolks | 1.49 |
| Dry sucrose | 0.60 |
| Gelatin | 0.20 |
| Vitamin E | 0.01 |
| Vanilla | 0.40 |
| Color | 0.04 |
| | 100.00 |

The intermediate melting polyol polyesters are a sucrose polyester composition made by esterifying sucrose with a mixture of methyl esters derived from a 45/55 blend of touch-hardened soybean oil (I.V. 107) and fully hydrogenated soybean oil (I.V. 8). This composition has the following physical and chemical properties:

| | |
|---|---|
| Viscosity (100° F., 37.8° C.) | 42.9 poise |
| Liquid/Solid Stability (100° F., 37.8° C.) | 100% |
| SFC (98.6° F., 37° C.) | 12.6% |
| I.V. | 46.5 |
| FAC | |
| C16:0 | 9.6% |
| C18:0 | 52.7% |
| C18:1 | 21.3% |
| C18:2 | 14.7% |
| C18:3 | 1.0% |
| C20:0 | 0.5% |
| C22:0 | 0.2% |
| Esters | |
| Octa | 82.1% |
| Hepta | 17.9% |

In forming the preemulsion, condensed skim milk, intermediate melting polyol polyesters, polysorbate 60 and DIMODAN 0 emulsifiers, and a premixed blend of carrageenan stabilizer and sucrose is added to a kettle. The contents of the kettle are mixed together and heated to a temperature of 160° F. (71.1° C.), held at this temperature for 30 minutes and then passed through a two-stage homogenizer operated at a pressure of 1700 psi in the first stage and 500 psi in the second stage. The preemulsion obtained is cooled to a temperature of 40° F. (4.4° C.) or less.

A second mixture of ingredients is formed by adding the milk, cream, water, sweetened whole condensed milk, preemulsion, corn syrup, egg yolks, vitamin E, and a premixed blend of sucrose, gelatin and liquid sugar, to a mix tank in the order indicated. The contents of the mix tank are mixed together and preheated to a temperature of 100°–110° F. (37.8°–43.3° C.). This preheated mixture is raised to a temperature of 145°–150° F. (62.8°–65.6° C.) and then passed through a two-stage homogenizer operated at a pressure of 1700 psi in the first stage and 500 psi in the second stage. The homogenized mixture is then pasteurized at a temperature of 175°–180° F. (79.4°–82.2° C.) for a period of approximately 30 seconds. The homogenized pasteurized mixture is cooled to a temperature of approximately 40° F. (4.4° C.) and then aged at this cooler temperature for a period of 1–2 hours. Vanilla flavoring and coloring is added to the aged mixture. The flavored and colored mixture is frozen while incorporating air to 100% overrun at 22°–23° F. (−5.6° to −5.0° C.) for 26–36 seconds in a continuous freezer to provide an aerated, semisolid, pumpable mixture which is filled into cartons and then fully hardened at −40° F. (−40° C.) for 16 hours to provide a firm product.

What is claimed is:

1. A low calorie frozen dessert product, which comprises:
    a) from about 2 to about 20% fat comprising from about 30 to 100% of edible, wholly or partially nondigestible polyol fatty acid polyesters having at least 4 fatty acid ester groups, wherein said polyol contains at least 4 hydroxy groups and wherein each fatty acid group has from 2 to 24 carbon atoms, said polyol polyesters further having:
        1) viscosity of from about 2.5 to about 200 poise at 100° F. (37.8C.) and at a shear rate of 10 second$^{-1}$ and at a shear rate of 10 seconds$^{-1}$; and
        2) a liquid/solid stability of at least about 30% at 100° F. (37.8C.);
    b) from about 9 to about 15% milk solids other than fat;
    c) from about 10 to about 20% of a sweetener;
    d) from about 0.05 to about 2% of an oil-in-water emulsifier;
    e) from about 0.01 to about 20% of a flavoring substance;
    f) from about 62 to about 75% water;
    g) wherein said fat is substantially homogeneously dispersed in he aqueous phase as emulsified fat particles having an average particle size of about 5 microns or less.

2. The product of claim 1 which comprises from about 10 to about 20% fat comprising from about 50 to 100% of said polyol polyesters.

3. The product of claim 2 wherein said polyol polyesters are at least about 70% nondigestible and have a viscosity of from about 5 to about 100 poise, a liquid/solid stability of at least about 50%, and a Solid Fat Content of about 20% or less at 98.6° F. (37° C.).

4. The product of claim 3 wherein said polyol polyesters have a viscosity of from about 20 to about 60 poise, a liquid/solid stability of at least about 80% and a Solid Fat Content of from about 6 to about 15%.

5. The product of claim 3 wherein said polyol is selected from the group consisting of sugars and sugar alcohols containing from 4 to 8 hydroxy groups and wherein each fatty acid ester group contains from 8 to 22 carbon atoms.

6. The product of claim 5 wherein said polyol polyesters are sucrose fatty acid polyesters having at least about 85% esters selected from the group consisting of octaesters, heptaesters, hexaesters and mixtures thereof.

7. The product of claim 6 wherein said fatty acid ester groups comprise at least about 70% fatty acids selected from the group consisting of lauric, myristic, palmitic, stearic, $C_{18:1}$, $C_{18:2}$ and behenic acids, and mixtures thereof, and wherein said sucrose polyesters comprise at least about 70% octaesters.

8. The product of claim 5 wherein said sweetener is a noncaloric or reduced calorie sweetener.

9. The product of claim 8 which further comprises of a reduced calorie sugar selected from the group consisting of 5-C-hydroxymethyl hexose compounds and their derivatives.

10. The product of claim 5 wherein said sweetener is a nutritive carbohydrate sweetener selected from the group consisting of sucrose, glucose, fructose, maltose, corn syrups, invert sugar, maple syrup, maple sugar, honey, brown sugar, refiners syrup and mixtures thereof.

11. The product of claim 10 wherein said emulsifier is selected from the group consisting of monoglycerides of $C_{16}$–$C_{18}$ fatty acids, diglycerides of $C_{16}$–$C_{18}$ fatty acids, ethoxylated monoglycerides, ethoxylated diglycerides, polyoxyethylene (20) sorbitan monostearate, polyoxyethylene (20) sorbitan tristearate, polyoxyethylene (20) sorbitan monooleate, propylene glycol monoesters of $C_{16}$–$C_{18}$ fatty acids, diacetyl sodium sulfosuccinate, and mixtures thereof.

12. The product of claim 11 wherein said emulsifier is selected from the group consisting of monoglycerides of $C_{16}$–$C_{18}$ fatty acids, polyoxyethylene (20) sorbitan monostearate and mixtures thereof in an amount of from about 0.1 to about 0.5%.

13. The product of claim 11 which further comprises a stabilizer in an amount of from about 0.05 to about 0.5%.

14. The product of claim 13 wherein said stabilizer is selected from the group consisting of carrageenan, gelatin and mixtures thereof.

15. The product of claim 11 wherein said emulsified fat particles have an average particle size of about 2 microns or less.

16. A stable oil-in-water preemulsion, which consists essentially of:
  a) from about 30 to about 50% fat comprising from about 70 to 100% of edible, wholly or partially nondigestible intermediate melting polyol fatty acid polyesters having at least 4 fatty acid ester groups, wherein said polyol contains at least 4 hydroxy groups and wherein each fatty acid group has from 2 to 24 carbon atoms, said polyol polyesters further having:
    1) a viscosity of from about 2.5 to about 200 poise at 100° F. (37.8° C.) and at a shear rate of 10 seconds$^{-1}$; and
    2) a liquid/solid stability of at least about 30% at 100° F. (37.8° C.);
  b) from about 10 to about 30% milk solids other than fat;
  c) from 0 to about 10% of a sweetener;
  d) from 0 to about 3% of a stabilizer;
  e) from about 0.3 to about 0.8% of an oil-in-water emulsifier;
  f) from about 25 to about 45% water;
  g) said fat being substantially homogeneously dispersed in the aqueous phase as emulsified fat droplets having an average droplet size of about 5 microns or less.

17. The preemulsion of claim 16 which comprises from about 35 to about 45% fat comprising from about 90 to 100% of said polyol polyesters, and from about 13 to about 24% milk solids other than fat.

18. The preemulsion of claim 17 wherein said polyol polyesters are at least about 70% nondigestible and have a viscosity of from about 5 to about 100 poise, a liquid/solid stability of at least about 50%, and a Solid Fat Content of about 20% or less at 98.6° F. (37° C.).

19. The preemulsion of claim 18 wherein said polyol polyesters have a viscosity of from about 20 to about 60 poise, a liquid/solid stability of at least about 80% and a Solid Fat Content of from about 6 to about 15%.

20. The preemulsion of claim 18 wherein said polyol is selected from the group consisting of sugars and sugar alcohols containing from 4 to 8 hydroxy groups and wherein each fatty acid ester group contains from 8 to 22 carbon atoms.

21. The preemulsion of claim 20 wherein said polyol polyesters are sucrose fatty acid polyesters having at least about 85% esters selected from the group consisting of octaesters, heptaesters, hexaesters and mixtures thereof.

22. The preemulsion of claim 21 wherein said fatty acid ester groups comprise at least about 70% fatty acids selected from the group consisting of lauric, myristic, palmitic, stearic, $C_{18:1}$, $C_{18:2}$ and behenic acids, and mixtures thereof, and wherein said sucrose polyesters comprise at least about 70% octaesters.

23. The preemulsion of claim 20 wherein said sweetener is a nutritive carbohydrate sweetener selected from the group consisting of sucrose, glucose, fructose, maltose, corn syrups, invert sugar, maple syrup, maple sugar, honey, brown sugar, refiners syrup and mixtures thereof in an amount of from about 1 to about 5%.

24. The preemulsion of claim 23 wherein said emulsifier is selected from the group consisting of monoglycerides of $C_{16}$–$C_{18}$ fatty acids, diglycerides of $C_{16}$–$C_{18}$ fatty acids, ethoxylated monoglycerides, ethoxylated diglycerides, polyoxyethylene (20) sorbitan monostearate, polyoxyethylene (20) sorbitan tristearate, polyoxyethylene (20) sorbitan monooleate, propylene glycol monoesters of $C_{16}$–$C_{18}$ fatty acids, diacetyl sodium sulfosuccinate, and mixtures thereof.

25. The preemulsion of claim 24 wherein said emulsifier is selected from the group consisting of monoglycerides of $C_{16}$–$C_{18}$ fatty acids, polyoxyethylene (20) sorbitan monostearate and mixtures thereof.

26. The preemulsion of claim 25 wherein said stabilizer is carrageenan in an amount of from about 0.05 to about 2%.

27. The preemulsion of claim 23 which comprises from about 30 to about 40% water.

* * * * *